(12) United States Patent  
Guillemette

(10) Patent No.: US 10,500,474 B2
(45) Date of Patent: Dec. 10, 2019

(54) DATA-COLLECTING PLAY OBJECT, SYSTEM AND METHOD

(71) Applicant: INTELLISPORTS INC., Montréal (CA)

(72) Inventor: Jonathan Guillemette, Montreal (CA)

(73) Assignee: INTELLISPORTS INC., Montreal, Quebec (CA)

(*) Notice: Subject to any disclaimer, the term of this patent is extended or adjusted under 35 U.S.C. 154(b) by 0 days.

(21) Appl. No.: 15/763,958

(22) PCT Filed: Sep. 30, 2016

(86) PCT No.: PCT/CA2016/051137
§ 371 (c)(1),
(2) Date: Mar. 28, 2018

(87) PCT Pub. No.: WO2017/054082
PCT Pub. Date: Apr. 6, 2017

(65) Prior Publication Data
US 2018/0290043 A1    Oct. 11, 2018

Related U.S. Application Data

(60) Provisional application No. 62/234,761, filed on Sep. 30, 2015.

(51) Int. Cl.
*A63B 39/00* (2006.01)
*A63B 71/06* (2006.01)
(Continued)

(52) U.S. Cl.
CPC ...... *A63B 71/0619* (2013.01); *A63B 24/0062* (2013.01); *A63B 39/00* (2013.01);
(Continued)

(58) Field of Classification Search
CPC ............ A63B 71/0619; A63B 71/0622; A63B 71/146; A63B 59/70; A63B 24/0062;
(Continued)

(56) References Cited

U.S. PATENT DOCUMENTS 5,564,698 A   10/1996  Honey et al.
8,231,506 B2   7/2012  Molyneux et al.
(Continued)

OTHER PUBLICATIONS

European Search Report dated Apr. 26, 2019 (Application No. 16849984.6).
(Continued)

*Primary Examiner* — Corbett B Coburn
(74) *Attorney, Agent, or Firm* — Norton Rose Fulbright Canada LLP

(57) ABSTRACT

A data-collecting play object. The play object includes a body manipulated by a player. A data-collecting unit is disposed in the interior of the body. The data-collecting unit includes an accelerometer unit measuring acceleration values along at least one translational degree of freedom, a gyroscope unit measuring rotation values about at least one rotational degree of freedom, and a processor in communication with the accelerometer unit and with the gyroscope unit. The processor obtains the acceleration values from the accelerometer unit and the rotation values from the gyroscope unit. The processor wirelessly transmits the acceleration and rotation values at discrete intervals. A power source supplies electrical power to the accelerometer unit, the gyroscope unit, and the processor. The play object being used in combination with an identification tag attached to a play accessory is also disclosed. A system and a method are also disclosed.

7 Claims, 4 Drawing Sheets

(51) Int. Cl.
*G01C 22/02* (2006.01)
*G01P 1/12* (2006.01)
*G01P 15/00* (2006.01)
*G01C 22/00* (2006.01)
*A63B 67/14* (2006.01)
*A63B 24/00* (2006.01)
*A63B 59/70* (2015.01)
*A63B 71/14* (2006.01)
*A63B 102/24* (2015.01)
*A63B 102/32* (2015.01)
*A63B 102/20* (2015.01)
*A63B 102/14* (2015.01)
*A63B 102/18* (2015.01)

(52) U.S. Cl.
CPC .............. *A63B 59/70* (2015.10); *A63B 67/14* (2013.01); *G01C 22/00* (2013.01); *G01C 22/02* (2013.01); *G01P 1/127* (2013.01); *G01P 15/00* (2013.01); *A63B 71/0622* (2013.01); *A63B 71/146* (2013.01); *A63B 2102/14* (2015.10); *A63B 2102/18* (2015.10); *A63B 2102/182* (2015.10); *A63B 2102/20* (2015.10); *A63B 2102/24* (2015.10); *A63B 2102/32* (2015.10); *A63B 2220/34* (2013.01); *A63B 2220/40* (2013.01); *A63B 2220/44* (2013.01); *A63B 2220/803* (2013.01); *A63B 2220/833* (2013.01); *A63B 2225/20* (2013.01); *A63B 2225/50* (2013.01); *A63B 2225/54* (2013.01); *A63B 2243/007* (2013.01); *A63B 2243/0025* (2013.01); *A63B 2243/0037* (2013.01); *A63B 2243/0054* (2013.01)

(58) Field of Classification Search
CPC . A63B 39/00; A63B 2102/14; A63B 2102/18; A63B 2102/182; A63B 2102/20; A63B 2102/24; A63B 2102/32; A63B 2220/34; A63B 2220/40; A63B 2220/44; A63B 2220/803; A63B 2220/833; A63B 2225/20; A63B 2225/50; A63B 2225/54; A63B 2243/0025; A63B 2243/0037; A63B 2243/0054; A63B 2243/007; G01C 22/00; G01C 22/02; G01P 1/127; G01P 15/00

See application file for complete search history.

(56) References Cited

U.S. PATENT DOCUMENTS

| | | |
|---|---|---|
| 2005/0032582 A1 | 2/2005 | Mahajan et al. |
| 2010/0184563 A1* | 7/2010 | Molyneux ............ A43B 1/0054 482/1 |
| 2011/0250819 A1 | 10/2011 | Tashman |
| 2011/0304497 A1* | 12/2011 | Molyneux ............ A43B 1/0054 342/42 |
| 2012/0142443 A1* | 6/2012 | Savarese ................ A63B 71/06 473/199 |
| 2013/0144411 A1* | 6/2013 | Savarese ................ G06F 17/40 700/91 |
| 2014/0089069 A1 | 3/2014 | Matthews et al. |
| 2014/0221137 A1 | 8/2014 | Krysiak et al. |
| 2014/0266160 A1 | 9/2014 | Coza |
| 2014/0309058 A1 | 10/2014 | San Juan |
| 2014/0349267 A1 | 11/2014 | Thornton |
| 2014/0357392 A1 | 12/2014 | Goel et al. |
| 2015/0057111 A1 | 2/2015 | Tremblay-Munger et al. |
| 2015/0080142 A1 | 3/2015 | Kline |
| 2015/0157944 A1 | 6/2015 | Gottlieb |
| 2016/0030814 A1 | 2/2016 | Young |
| 2016/0121164 A1* | 5/2016 | Coza ................... G09B 19/0038 473/570 |

OTHER PUBLICATIONS

International Search Report dated Oct. 17, 2016 for International Patent Application No. PCT/CA2016/051137.

* cited by examiner

DATA-COLLECTING PLAY OBJECT, SYSTEM AND METHOD

CROSS REFERENCE TO RELATED APPLICATIONS

This application is a national stage filing under 35 U.S.C. 371 of International Application PCT/CA2016/051137 filed Sep. 30, 2016, which claims priority to provisional patent application having Ser. No. 62/234,761 and filed Sep. 30, 2015, the entire contents of both of which are incorporated by reference herein.

TECHNICAL FIELD

The application relates generally to objects of play and, more particularly, to a play object, system, and method for collecting and transmitting data.

BACKGROUND OF THE ART

Intelligent gaming objects, such as balls, pucks, discs, and sticks, collect information about the movement of the gaming object. This information can be transmitted from the gaming object and analysed to obtain information about the player's skills.

The information collected and transmitted by these gaming objects is often insufficient to be used to adequately assess a player's skills. Sometimes, a gaming object collects information about a specific skill, and is thus incapable of assessing other skills, or related skills. Furthermore, the information is often not sampled at a high enough rate, which results in lower quality measurements that can lead to incorrect conclusions about a player's skill level.

SUMMARY

In one aspect, there is provided a play object, comprising: a body having an outer surface to be manipulated by a player and an interior; and a data-collecting unit disposed in the interior of the body and operable during at least movement of the play object, the data-collecting unit comprising: an accelerometer unit measuring acceleration values of the play object along at least one translational degree of freedom; a gyroscope unit measuring rotation values of the play object about at least one rotational degree of freedom; a processor in communication with the accelerometer unit and with the gyroscope unit, the processor obtaining the acceleration values from the accelerometer unit and the rotation values from the gyroscope unit, and wirelessly transmitting the acceleration and rotation values at discrete intervals; and a power source supplying electrical power to the accelerometer unit, the gyroscope unit, and the processor.

In another aspect, there is provided a system for analysing data generated by play activity, comprising: at least one play object having a data-collecting unit disposed within the at least one play object and operable during at least movement of the at least one play object, the data-collecting unit comprising: an accelerometer unit measuring acceleration values of the at least one play object along at least one translational degree of freedom; a gyroscope unit measuring rotation values of the at least one play object about at least one rotational degree of freedom; a processor in communication with the accelerometer unit and with the gyroscope unit, the processor obtaining the acceleration values from the accelerometer unit and the rotation values from the gyroscope unit, and wirelessly transmitting the acceleration and rotation values at discrete intervals; and a power source supplying electrical power to the accelerometer unit, the gyroscope unit, and the processor; a system memory having stored therein the acceleration and rotation values; a system processor in communication with the system memory and with the processor of the data-collecting unit; and at least one application stored in the system memory, and executable by the system processor to: receive the acceleration and rotation values from the processor; analyse at least one of the acceleration values and the rotation values along at least one of the translational and rotational degrees of freedom, and generate data indicative of player performance; and output the data indicative of player performance.

In a further aspect, there is provided a method for collecting data about a play object, comprising: measuring acceleration values of the play object about at least one translational degree of freedom at least during movement of the play object; measuring rotation values of the play object about at least one rotational degree of freedom at least during movement of the play object; and wirelessly transmitting the acceleration and rotation values at discrete intervals from the play object, the acceleration and rotation values being indicative of performance of a player using the play object.

In a further aspect, there is provided a play object in combination with an identification tag, the identification tag being attachable to a play accessory for engaging the play object, the play object and identification tag comprising: a body of the play object having an outer surface to be engaged by the play accessory upon a player using the play accessory, the body having an interior; a transceiver of the play object attached to the body and operable to emit an activation signal at least upon the body being engaged by the play accessory, and to receive signals from the identification tag; the identification tag on the play accessory being operable to receive the activation signal from the transceiver and to emit in response thereto an identification signal to the transceiver, the identification signal comprising information on the player using the play accessory; and a data-collecting unit of the play object disposed in the interior of the body and operable during at least movement of the play object, the data-collecting unit comprising: an accelerometer unit measuring acceleration values of the play object along at least one translational degree of freedom; a gyroscope unit measuring rotation values of the play object about at least one rotational degree of freedom; a processor in communication with the transceiver, the accelerometer unit, and the gyroscope unit, the processor obtaining the acceleration values from the accelerometer unit, the rotation values from the gyroscope unit, and the identification signal from the transceiver, the processor wirelessly transmitting the acceleration values, the rotation values, and the identification signal; and a power source supplying electrical power to the transceiver, the accelerometer unit, the gyroscope unit, and the processor.

DESCRIPTION OF THE DRAWINGS

Reference is now made to the accompanying figures in which.

DETAILED DESCRIPTION

Figure 1:
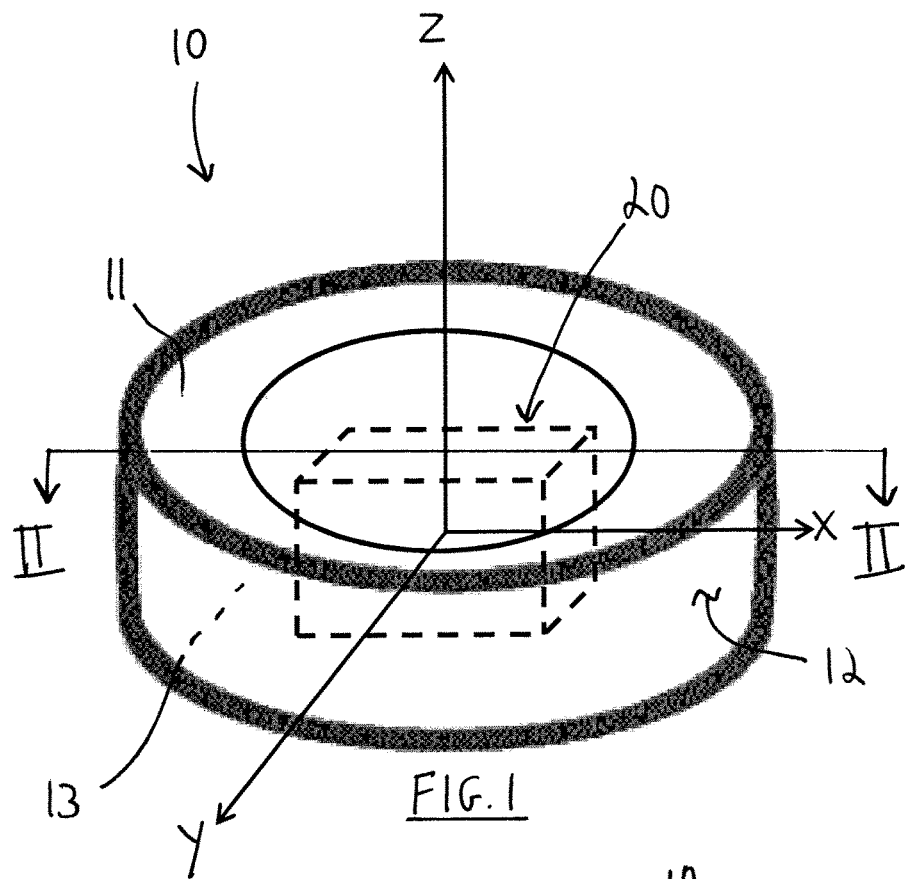
FIG. 1 is a perspective view of a play object having a data-collecting unit, according to an embodiment of the present disclosure.
Figure 2:
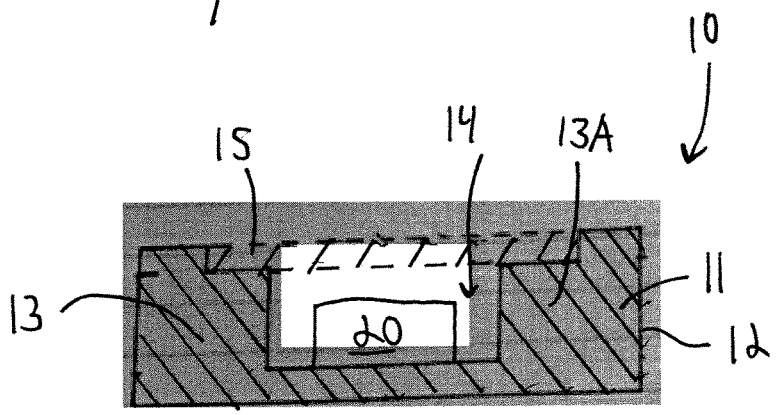
FIG. 2 is a schematic cross-sectional view of the play object and data-collecting unit of FIG. 1, taken along the line II-II.
Figure 3:
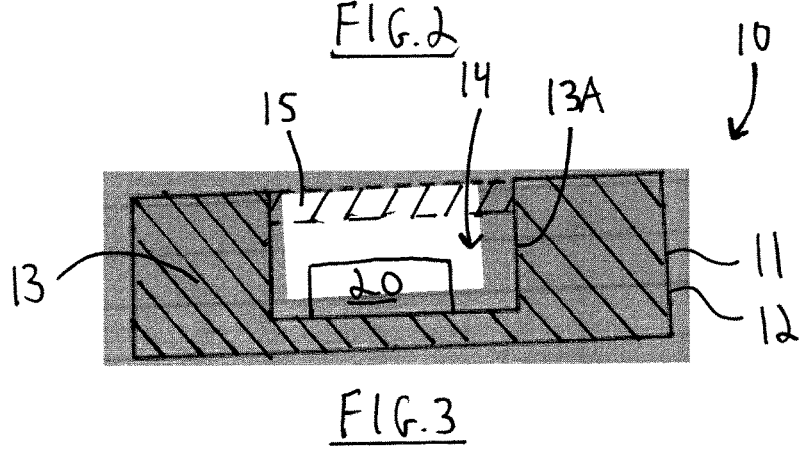
FIG. 3 is another schematic cross-sectional view of the play object and data-collecting unit of FIG. 1.

FIGS. 1 to 3 illustrate a play object 10 for collecting and transmitting data. The data collected and transmitted can be analysed to provide information about the skills of the player using the play object 10. The play object 10 can therefore serve as a diagnostic or analytic tool for evaluating player performance.

The play object 10 can be any object or device used during sports or activities. The play object 10 is manipulated during use, either directly or indirectly, by a player such that it undergoes movement. Some non-limiting examples of play objects 10 included in the scope of the present disclosure include a ball (baseball, softball, golf, lacrosse, cricket, bowling, football, soccer ball, basketball, etc.), a disc (i.e. such as a Frisbee™), and a puck. Some of the play objects 10 in the preceding list of examples have solid inner cores, and do not have hollow interiors. Other play objects 10 in the preceding list of examples have hollow interiors, typically filled with air. In the embodiment of FIGS. 1 to 3, the play object 10 is a hockey puck. Reference herein to hockey pucks or skills associated with hockey does not limit the disclosed play object 10 to being only a hockey puck, or to being used only in the sport of hockey.

The play object 10 has a body 11, which forms the corpus of the play object 10 and provides structure thereto. An outer surface 12 of the body 11 is typically manipulated by the player to displace the play object 10, either directly by the player's hand or indirectly via an intermediate object such as a stick or a bat. In the embodiment shown where the play object 10 is a hockey puck, the outer surface 12 is cylindrical with flat upper and lower surfaces. In the depicted embodiment, the body 11 also has an interior 13 which includes a solid inner core 13A.

The play object 10 has six degrees of freedom and is manipulated to be move therein. More particularly, the play object 10 has three translational degrees of freedom in which it is displaced, and three rotational degrees of freedom about which it rotates. These degrees of freedom are more easily appreciated by referring to the play object's 10 own coordinate system, defined by three orthogonal axes of motion, namely an X axis, a Y axis, and a Z axis. The three translational degrees of freedom are displacement movements of the play object along the X, Y, and Z axes. In the depicted embodiment, the X and Y axes define movement along a horizontal plane, and the Z axis is vertically oriented and defines movement in a vertical direction. The three rotational degrees of freedom are rotational movements about the X, Y, and Z axes.

The play object 10 also has a data-collecting unit 20 disposed within the interior 13 of the body 11 of the play object 10. In the depicted embodiment, the data-collecting unit 20 is part of the solid inner core 13A of the body 11. The data-collecting unit 20 collects data related to the movement of the play object 10, and transmits the data to a separate and remote device or system so that it can be analysed to provide information on player performance. This movement data can vary, and is data related to the displacement of the play object 10 about itself, through space, and in time. It will be appreciated that the data-collecting unit 20 can also be operational when the play object 10 is stationary.

The location of the data-collecting unit 20 within the play object 10 can vary, depending on the type of play object 10 being used and the nature of movement data being collected. For example, in the embodiment of FIG. 1 where the play object 10 is a hockey puck, the data-collecting unit 20 is fixedly secured in place within the interior 13 of the puck itself, as part of its inner core 13A. Referring more particularly to FIGS. 2 and 3, the hockey puck has a cavity 14 extending into the interior 13 of the puck. The cavity 14 is sized to receive the data-collecting unit 20, which can be secured to the sides or floor of the cavity with an adhesive or a mechanical fastener. Any adhesive solution or mechanical fastener can be used to secured the data-collecting unit 20 within the puck provided that it does not adversely affect the weight of the puck. The fixed relationship between the data-collecting unit 20 and the walls of the cavity 14 ensures that there is no relative movement between the data-collecting unit 20 and the play object 10, thereby enabling the data-collecting unit 20 to directly measure the movement of the play object 10. The cavity 14, and the data-collecting unit 20 therein, can be sealed with a cap 15. For other types of play objects 10, there may not be a cavity 14 and sealing cap 15, and the data-collecting unit 20 can be rigidly disposed within the play object 10 using any suitable technique.

Figure 4:
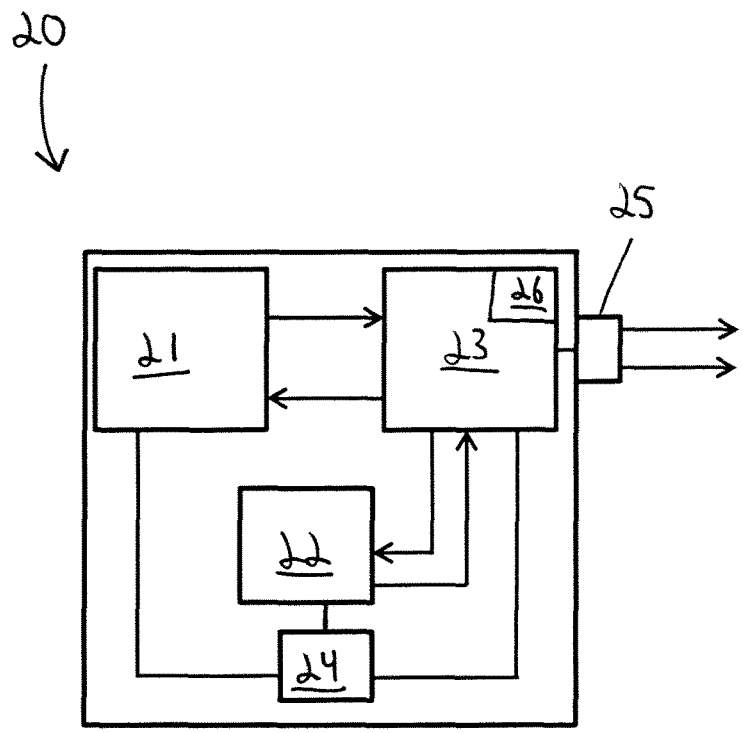
FIG. 4 is a schematic view of the data-collecting unit of FIG. 1.

Referring to FIG. 4, the data-collecting unit 20 measures the movement of the play object 10 with one or more accelerometer units 21, and one or more gyroscope units 22. A processor 23 communicates with the accelerometer and gyroscope units 21,22 and transmits their measured values away from the play object 10 to a remote system or device for analysing the data. A power source 24 provides electrical power to each of the accelerometer unit 21, the gyroscope unit 22, and the processor 23. These components of the data-collecting unit 20 are now discussed in greater detail.

The accelerometer unit 21 measures the movement of the play object 10 by generating its acceleration values along one or more of the three translational degrees of freedom. "Acceleration values" are understood herein to include acceleration vectors, as well as time derivatives/integrals of these values such as speed and displacement. The acceleration values therefore have information on the direction of acceleration along any one of the X, Y, and Z axes, as well as the magnitude of acceleration. The accelerometer unit 21 outputs the acceleration values in units of distance per unit of time squared (e.g. in/$s^2$, cm/$s^2$, ft/$s^2$, m/$s^2$, etc.). For example, it is possible to determine the velocity and speed of the play object 10, along any one of the X, Y, and Z axes, from the measured acceleration values. It is similarly possible to determine the distance traveled by the play object 10 along any one of the axes from the measured acceleration values. If the starting point of the play object 10 is known or provided by the player, the distance can be used to determine the displacement of the play object 10 within another coordinate system at any given moment in time. It can thus be appreciated that the accelerometer unit 21 can be any device capable of such functionality, and typically includes an accelerometer and an associated memory or processor.

Still referring to FIG. 4, the accelerometer unit 21 samples or collects data constantly, at discrete time intervals. The accelerometer unit 21 generally measures the acceleration values at a relative high frequency. This sampling frequency can be in the range of 500 Hz to 2 kHz, for example, although other sampling frequencies are also within the scope of the present disclosure. The higher the sampling frequency, the more accurate the subsequent measurements will be, and hence the better the evaluation of player performance. The nature of the accelerometer unit 21 can also vary, depending on the type of play object 10 being used and the data being obtained. For example, in the embodiment where the play object 10 is a hockey puck, the accelerometer unit 21 is a "high g" accelerometer unit 21, meaning that it is capable of measuring higher accelerations values in the order of hundreds of "g". It will be appreciated that such a high g accelerometer unit 21 is capable of capturing lower acceleration values as well. As explained in greater detail below, this high g accelerometer unit 21 helps to capture movements of the play object 10 where it undergoes large accelerations, such as when taking a shot with the hockey puck. In an alternate embodiment the accelerometer unit 21 is a "low g" accelerometer unit 21, meaning that it is capable of measuring lower accelerations values in the order of tens of "g". This low g accelerometer unit 21 helps to capture movements of the play object 10 where it undergoes relative low accelerations, such as during stick handling of a hockey puck or when a player skates with the puck. It will be appreciated that other "g" values are within the scope of the present disclosure, and that the accelerometer unit 21 may have multiple accelerometer units 21, of both the high or low "g" types. Indeed, using both a high and low g accelerometer unit 21 enables every relevant movement of the play object 10 to be captured by the data-collecting unit 20 within a wide range of acceleration values.

The gyroscope unit 22 measures the movement of the play object 10 by producing its rotation values about one or more of the three rotational degrees of freedom. "Rotation values" are understood herein to include measurements of the rotation or "spin" of the play object 10, as well as time derivatives/integrals of these values. The rotation values include information on the direction of rotation about any one of the X, Y, and Z axes, as well as the magnitude of rotation. For example, it is possible to determine the angular velocity or speed, as well as the RPM of the play object 10, about any one of the X, Y, and Z axes from the rotation values. The gyroscope unit 22 outputs the rotation values in units of angular displacement per unit of time (e.g. deg/s, rad/s, etc.).

Knowing the rotational speed may provide information about the stability of the play object 10 as it travels. For example, in the embodiment where the play object 10 is a hockey puck, knowing the RPM of the puck in the Z axis, as well as variances in the RPM, is indicative of the stability or "straightness" of the puck as it travels through the air. The gyroscopic effect teaches that a puck rotating at a higher speed will be more stable in its plane of rotation than a puck rotating at a lower speed in the same plane because a small deviation applied to the rotating puck will be more quickly corrected in the faster rotating puck. It is also possible to determine the angular acceleration of the play object 10, which may be important to know for some sporting activities (e.g. rotation of a baseball), from the rotation values. The gyroscope unit 22 can be any device capable of such functionality, and typically includes a gyroscope and an associated memory or processor.

Still referring to FIG. 4, the gyroscope unit 22 samples or collects data constantly, at discrete time intervals. The gyroscope unit 22 can measure the rotation values at a relative high frequency, an example of which is the range of about 500 Hz to about 1 kHz. This helps to ensure a high granularity of rotation values generated by the gyroscope unit 22 and transmitted by the play object 10. The nature of the gyroscope unit 22 can also vary, depending on the type of play object 10 being used and the data being obtained. A lower capacity gyroscope unit 22, such as one that can measure rotations in the order of hundreds of deg/s, may be useful for those play objects 10 for which it is not required or beneficial to measure high speeds of rotations. A higher capacity gyroscope unit 22, such as in the range of thousands of deg/s, may be useful for those play objects 10 for which it is beneficial to measure high speeds of rotations, such as during the rotation of a hockey puck about the Z axis. An even higher capacity gyroscope unit 22, such as in the range of tens of thousands of deg/s, may be useful for those play objects 10 for which it is beneficial to capture very high speeds of rotation, such as those of a baseball thrown by an elite-level pitcher. It will therefore be appreciated that other "deg/s" values are within the scope of the present disclosure, and that the data-collecting unit 20 may have more than one gyroscope unit 22, of the both the high and low capacity types.

Both the accelerometer and gyroscope units 21,22 may collect movement data along one or more of the X, Y, and Z axes. For example, and as discussed in greater detail below, for some types of player drills, it may be suitable to deactivate data collection along/about one or more of the axes. This can involve instructing the accelerometer or gyroscope units 21,22 to not generate data along/about the axis in question. This can also involve having the processor 23 ignore the data collected related to the axis in question, or to not transmit the data from this axis. Disregarding data from one or more axes may reduce data transmission and analysis delays. In other situations, it may be desired to collect data from all three axes, in which case the accelerometer and gyroscope units 21,22 can be referred to as "triple axis" accelerometer and gyroscope units 21,22.

The processor 23 communicates with the accelerometer unit 21 and with the gyroscope unit 22 and obtains from them respectively the acceleration values and the rotation values. The processor 23 then transmits the acceleration and rotation values at discrete time intervals to a system or device which analyses this data. The processor 23 in most embodiments, but not necessarily all, does not perform data analysis itself. In such an embodiment, where the processor 23 operates primarily to transmit the acceleration and rotation values, the processor 23 helps to lower the energy consumption of the data-transmitting unit 20. As such, the processor 23 is integral with the accelerometer unit 21 and with the gyroscope unit 22. The processor 23 may therefore be any device that can collect and transmit data. Some non-limiting examples of the processor 23 include a microcontroller, a central processing unit (CPU), a front-end processor, a microprocessor, a graphics processing unit (GPU/VPU), a physics processing unit (PPU), a digital signal processor, and a network processor. The processor 23 may also be part of a flexible PCB, which would allow the data-collecting unit 20 to match a curvature of a play object 10, such as the curvature of a baseball.

Still referring to FIG. 4, the processor 23 transmits the acceleration and rotation values wirelessly. The transmission of the values is generally performed with a transmitting unit 25, such as an antenna or transceiver, to a remote device or network. In some embodiments, the transmitting unit 25 is a Bluetooth™ transmitter using low energy technology with a minimal transmission frequency (i.e. the frequency at which the transmitting unit 25 transmits the acceleration and rotation values). The transmission frequency can vary from about 30 Hz to about 140 Hz, for example.

If the rotation and/or acceleration values are generated faster than they can be transmitted (i.e. the sampling frequency of the accelerometer unit 21 and/or gyroscope unit 22 is greater than the transmission frequency of the transmitting unit 25), the accelerometer unit 21 and/or gyroscope unit 22 can be instructed to reduce their sampling frequency. For example, they can be instructed to reduce their sampling frequency to be lower than, or the same as, that of the transmission frequency.

However, it is sometimes desirable to maintain a high sampling frequency in order to obtain the highest granularity of data. In such instances, the acceleration and/or rotation values can be queued prior to being transmitted by the transmitting unit 25. The processor 23 in such an embodiment will have a memory 26, as shown in FIG. 4. The memory 26 receives the values from the processor 23 that are generated by the accelerometer and/or gyroscope units 21,22, so that the processor 23 can transmit them at the slower transmission frequency of the transmitting unit 25. The memory 26 may be a main memory, such as a high speed Random Access Memory (RAM). The memory may be any other type of memory, such as an optical storage media, and an Erasable Programmable Read-Only Memory (EPROM).

The processor 23 may instruct the memory 26 to store the acceleration and/or rotation values for a brief period of time corresponding to a specific sporting action, and to then transmit the data at the transmission frequency of the transmitting unit 25. For example, it may be desirable to have a high sampling frequency only during the duration of specific sporting actions, such as the moment of impact on the puck from a slap shot, or during release of a baseball from a player's hand. Therefore, the acceleration and/or rotation values are generated and queued in memory 26 only so long as it is desirable to do so, which prevents the acceleration and/or rotation values from flooding the transmitting unit 25 with data when there is no longer a need for high sampling frequency. This staggered data transmission helps to capture very granular data for "high-speed actions", which are actions where it is desirable to capture acceleration and/or rotation values faster than they can be transmitted. This functionality allows movement data to be generated at the speed of the accelerometer and/or gyroscope units 21,22, rather than lowering their sampling frequencies to match the frequency of transmission by the transmitting unit 25. By temporarily storing the movement data in the memory 26 and leaking it out at the transmission frequency allowed by the transmitting unit 25, it is possible to obtain a "data density" that surpasses the data density allowed by the transmitting unit 25.

Figure 5:
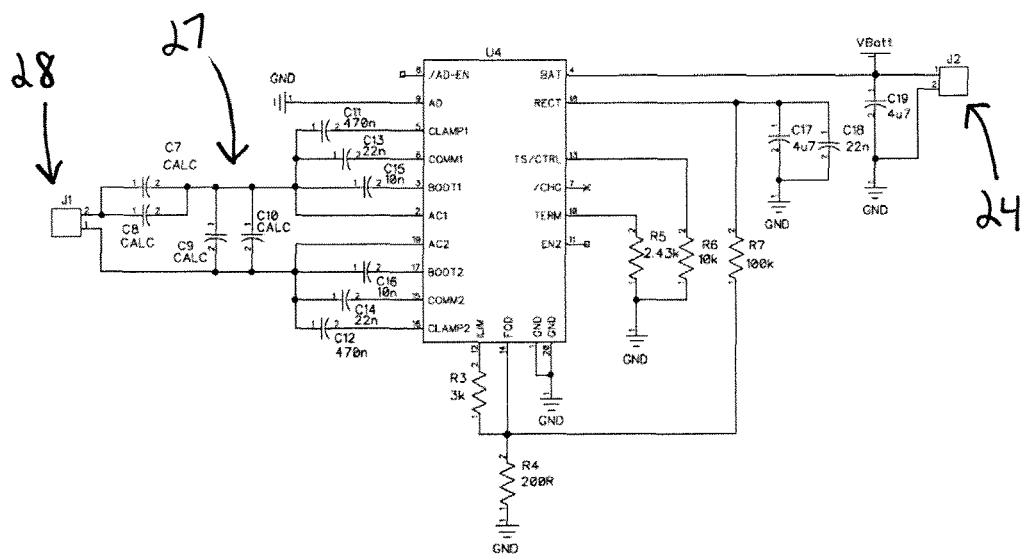
FIG. 5 is a circuit diagram of the data-collecting unit of FIG. 1.

The power source 24 provides electrical energy to the data-collecting device 20, and to its components the accelerometer unit 21, the gyroscope unit 22, and the processor 23. The play object 10 is a wireless device in the depicted embodiment. As such, the power source 24 is a portable power source 24, and may be a battery such as lead acid, nickel cadmium, nickel metal hybrid, lithium polymer, lithium ion, or any other type of suitable battery. In some embodiments, as shown in FIG. 5, the power source 24 has a non-contact rechargeable circuit 27 which is built into the play object 10. The rechargeable circuit 27 charges the power source 24 via induction, and includes a coil 28 in proximity to the circuitry of the data-collecting unit 20. When the play object 10 is placed on a charging pad, the rechargeable circuit 27 charges the power source 24 via induction. The power source 24 can also be plugged into a conventional outlet, depending on the type of play object 10 being used.

Figure 6:
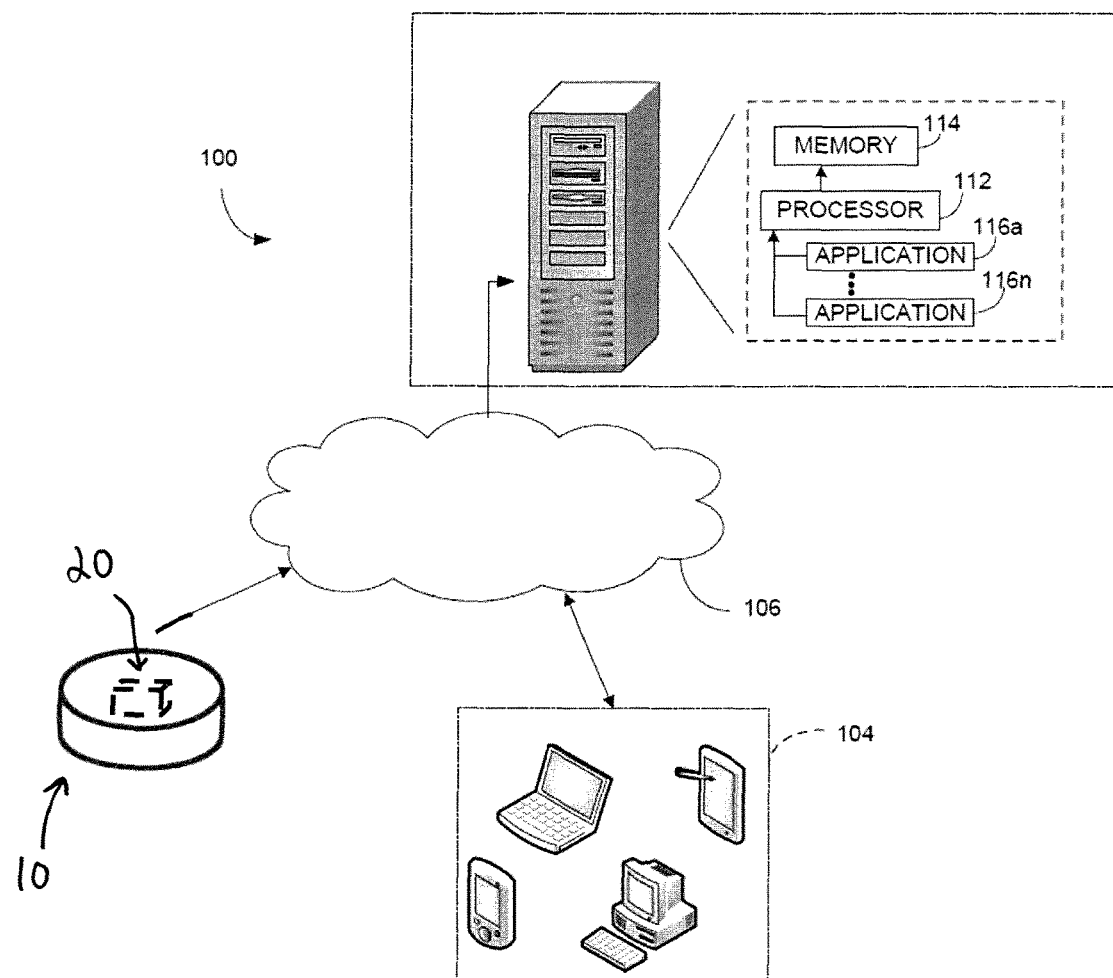
FIG. 6 is a schematic view of a system for analysing data generated by play activity having at least one of the play objects of FIG. 1.

Referring to FIG. 6, there is also provided a system 100 for analysing data generated by play activity. The system 100 is used to analyse the movement data provided by one or more play objects 10 in order to generate information related to player performance. The system 100 includes one or more play objects 10, such as the one described above. Each play object 10 generates movement data, as explained above, and transmits it to the system 100. The system 100 also has a system memory 114, a system processor 112, and one or more applications 116 stored in the system memory 114 which run on the system processor 112. The system memory 114, the system processor 112, and the applications 116 are shown as being housed within a casing of a physical computing device. In alternate embodiments, the system memory 114, the system processor 112, and the applications 116 are housed in another type of physical computing device (e.g. tablet, mobile communication device, laptop, etc.). In other alternate embodiments, the system memory 114, the system processor 112, and the applications 116 are not housed in a physical computing device, and are instead virtually present, such as in a cloud computing system.

The system memory 114 stores the acceleration and rotation values produced and transmitted by the data-collecting unit 20 of each play object 10. As the acceleration and rotation values are analysed by the system processor 112, or upon being prompted, the system memory 114 can be rewritten or modified to store therein new acceleration and rotation values. The system memory 114 may therefore be a main memory, such as a high speed Random Access Memory (RAM), or an auxiliary storage unit, such as a hard disk, a floppy disk, or a magnetic tape drive. The system memory 114 may be any other type of memory, such as a cloud memory system, or optical storage media such as a videodisc and a compact disc.

The system processor 112 executes the functions of the system 100, and more particularly, of the applications 116 stored in the system memory 114. The system processor 112 is in communication with each one of the play objects 10, via a suitable transmitting unit or system transceiver. The system processor 112 therefore receives from each of the play objects 10 the acceleration and rotation values that their processors transmit. The system processor 112 may also emit instructions to one or more of the processors of each of the play objects 10. For example, the system processor 112 can command all of the play objects 10 to produce movement data along one or more of the X, Y, and Z axes. The system processor 112 may send signals to deactivate one or more play objects 10. The system processor 112 may also configure each of the play objects 10, so as to change for example the sampling frequency at which the acceleration values are measured, to name only a few inputs.

The system processor 112 communicates directly with the play objects 10, or indirectly with the play objects 10 via a server or other network 106, such as the Internet, a cellular network, Wi-Fi, or others. Furthermore, the system 100 may have a signal concentrator in communication with the play objects 10 and with the system processor 112. The signal concentrator may aggregate or concentrate the acceleration and rotation values emitted by the play objects 10, and then relay this concentrated signal data to the system processor 112. Any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

The one or more applications 116 are executable on the system processor 112. It should be understood that while the applications 116 presented herein are illustrated and described as separate entities, they may be combined or separated in a variety of ways. The acceleration and rotation values emitted from each play object 10 are received by the application 116. The application 116 then analyses one or more of these values, along one or more of the degrees of freedom, so as to generate data indicative of player performance. The data indicative of player performance helps players, trainers, coaches, and managers to assess a player's skills and abilities. Some examples of data indicative of player performance are now described.

In the embodiment where the play object 10 is a hockey puck, it may be desirable to assess player performance related to how fast the player can make the puck travel. In such a situation, the application 116 manipulates the acceleration values along only the X, Y, and Z axes and determines an integral thereof to obtain the associated speed values. The magnitude of these speed values correspond to the maximum speed at which the puck traveled. The system 100 and application 116 in this embodiment therefore generate data indicative of a puck speed when shot by a player.

In the embodiment where the play object 10 is a hockey puck, it may be desirable to assess player performance related to "quick release", or how well the player release a puck without winding-up. In such a situation, the application 116 manipulates the acceleration values along only the X and Y axes using only a high "g" type accelerometer unit, and determines the magnitude of the acceleration values in these axes. Higher acceleration values, coupled with visual observations of the player's movement, provide information about the player's "quick release" abilities, for various types of shots (e.g. wrist shot, slap shot, etc.). The acceleration values are combined with the mass of the puck to obtain a force of release of the puck. The system 100 and application 116 in this embodiment therefore generate data indicative of how much force a player can apply to release a puck.

In the embodiment where the play object 10 is a hockey puck, it may be desirable to assess player performance related to "puck stability", or the ability of a player to shoot a puck straight. In such a situation, the application 116 determines the magnitude of the rotation values along only the Z axis, and thereby obtains the RPM of the puck about this axis. The RPM is a proxy for puck stability because of the gyroscopic effect, which indicates that the travel path of a fast rotating object will be less perturbed than that of a more slowly rotating object. The system 100 and application 116 in this embodiment therefore generate data indicative of how stably a player can shoot the puck.

In the embodiment where the play object 10 is a hockey puck, it may be desirable to assess player performance related to "saucer" passing, which are passes that should be lifted above an opponent while rotating in a substantially horizontal plane so that the puck lands flat on the ice ready for a teammate to shoot or handle. In such a situation, the application 116 determines the magnitude of the rotation values along only the X, Y, and Z axis, and thereby obtains the RPM of the puck about these axes. If the RPM values about the X or Y axes are below a threshold value, then they are indicative of the puck mostly rotating in the Z axis, and thus, in substantially horizontal plane. The system 100 and application 116 in this embodiment therefore generate data indicative of how well the player can effectuate a saucer pass.

In the embodiment where the play object 10 is a hockey puck, it may be desirable to assess player performance related to "stick handling", which is the ability of a player to control the puck on the ice. In such a situation, the application 116 determines the magnitude of the acceleration values along only the X and Y axes using a low "g" type accelerometer unit. Low acceleration values coupled with frequent displacements of the puck within the X-Y plane are indicative of a player having "soft hands", or good stick handling ability. In contrast, higher acceleration values coupled with fewer displacements of the puck within the X-Y plane can be indicative of a player having "hands of stone", or poor stick handling ability. The system 100 and application 116 in this embodiment therefore generate data indicative of how well a player is able to control the puck.

In the embodiment where the play object 10 is a baseball, it may be desirable to assess player performance related to the "hang" of a pitcher's slider, which is the ability of a ball to move laterally after release without too much vertical movement. In such a situation, the application 116 manipulates the acceleration values of all three of the X, Y, and Z axes using a low "g" type accelerometer unit, and determines an integral of these acceleration values to obtain the velocities along each axis. The application 116 then determines an integral of these velocities to obtain the displacement of the ball within the X-Y plane, and in the Z axis. If the displacement of the baseball in the X-Y plane exceeds that in the Z-axis (a suitable ratio can be used), then this movement is indicative of a good slider that does not "hang". The system 100 and application 116 in this embodiment therefore generate data indicative of how well a baseball pitcher is able to throw an effective slider, or any other "spinning" pitch. The system 100 can also track the displacement of a pitch in the X-Y plane and/or the Z axis. This generates data indicative of how well a baseball pitcher is able to throw a pitch (e.g. curveball, sinker, split-finger, change-up) that "drops", or displaces, in any one of the axes.

It will be appreciated that the embodiments described above of data indicative of player performance are not limiting, and that other types of such data, from hockey as well as from other sports, are within the scope of the present disclosure.

Still referring to FIG. 6, the system 100 has one or more output devices 104. The output devices 104 are in communication with the system processor 112, via the network 106 if necessary. Each output device 104 can be a portable or a stationary device 104. The output devices 104 include, but are not limited to, a display monitor, a smartphone, a desktop or laptop computer, and a tablet. Each output device 104 visually displays the data indicative of player performance, for example as a graphical representation. It will be appreciated that the data indicative of player performance can be provided in a non-graphical format, such as lists of data, a table, etc.

Some examples of how the data indicative of player performance is displayed are the following. The output devices 104 can display graphs with clear indicators of how the player's performance compares to those of her peers, or that provide a history of player performance over time to track changes in the player's skills. The output devices 104 can provide lists of personal "bests" and records. The output devices 104 can be interactive, and provide a list of player skills that the player wishes to assess. Some of this include "stick handling", "shot speed", "best shot", and "average shot". By selecting one of these player skills, the output device 104 can prompt the system processor 112 to adjust the processor of the play object 10 so that the accelerometer and gyroscope units collect data only along the axes related to the selected skill.

Figure 7:
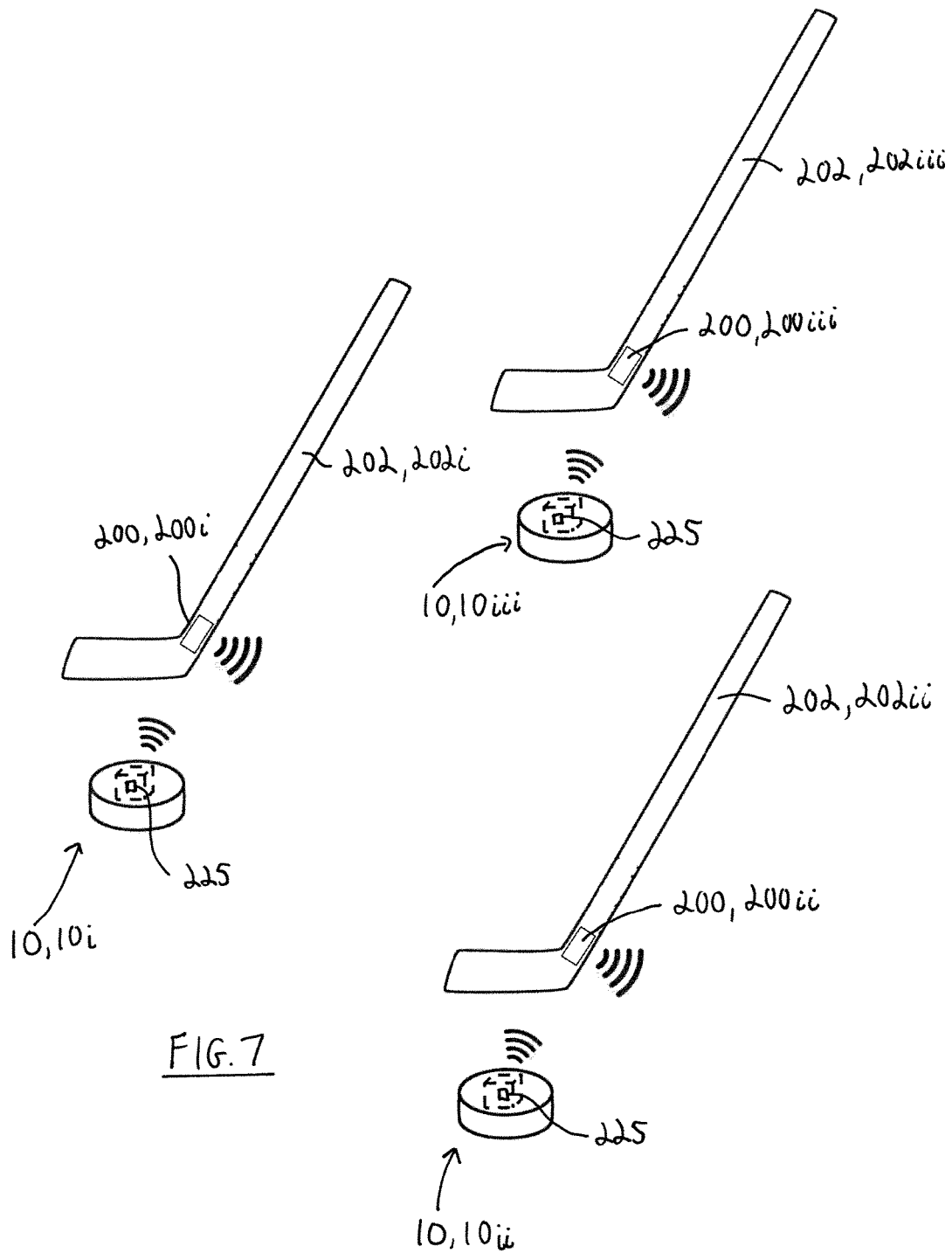
FIG. 7 is a schematic view of a plurality of the play object of FIG. 1 in combination with identification tags.

Referring to FIG. 7, there is also provided one or more play objects 10 in combination with an identification tag 200. The combination of each play object 10 with an identification tag 200 helps to determine which player is manipulating or engaging each play object 10. The play objects 10 are described above and thus will not be describe further. Each identification tag 200 is associated with a play accessory 202. More particularly, each identification tag 200 is attachable to some part of the play accessory 202, and if desired, removable therefrom. In the depicted embodiment, each play accessory 202 is separate and distinct from the play object 10 with which it engages. In the depicted embodiment, each identification tag 200 is associated with only one of the play accessories 202. Each play accessory 202 is shown as a hockey stick and the play object 10 is a hockey puck. The play accessory 202 in this embodiment is therefore used to displace the play object 10. The play accessory 202 is not limited to being a hockey stick, or to be used with hockey pucks. In alternate embodiments, the play accessory 202 is a glove, bat, racquet, or other object used to displace or engage the play object 10. Each play object 10 can be provided or sold with a corresponding identification tag 200.

In the depicted embodiment, each play object 10 includes a transceiver 225. The transceiver 225 emits information from the play object 10, and receives information from the vicinity around the play object 10. More particularly, when operating, the transceiver 225 emits an activation signal when the body of the play object 10 is engaged by the play accessory 202. In the depicted embodiment where the play accessory 202 is a hockey stick and the play object 10 is a hockey puck, the transceiver 225 emits the activation signal when the hockey stick moves the puck. The activation signal is directed away from the play object 10 and activates the identification tag 200, thereby triggering the identification tag 200 to respond, as described in greater detail below.

Still referring to FIG. 7, the transceiver 225 is attached to the body of the play object 10. In the depicted embodiment where the play object 10 is a hockey puck, the transceiver 225 is disposed at least partially within the interior of the body. In such an embodiment, the transceiver 225 can be the same component as the transmitting unit 25 described above. The transceiver 225 can also be connected to an antenna in the transmitting unit 25, or to the coil 28 of the rechargeable circuit 27. The transceiver 225 may therefore be an integrated circuit added to the processor of the play object 10. In alternate embodiments, the transceiver 225 includes an antenna that is at least partially exposed on the play object 10.

The emission of the activation signal by the transceiver 225 can occur in different ways. In a particular embodiment, the transceiver 225 emits the activation signal when the accelerometer unit 21 measures an acceleration value that exceeds a minimum threshold value. The threshold value can be any desired value depending on the desired response characteristics. For example, if it is desired to have the transceiver 225 emit the activation signal whenever it is moved, the threshold value can be set relatively low so that even a small movement of the play object 10 will trigger the emission of the activation signal. Similarly, if it is desired to have the transceiver 225 emit the activation signal only after a certain force has been applied to the play object, the threshold value can be set relatively high so that only forceful movements of the play object 10 will trigger the emission of the activation signal. It can thus be appreciated that in this embodiment, when the play object 10 feels an acceleration, it triggers the transceiver 225 to send out the activation signal, and as will be discussed in greater detail below, also primes the transceiver 225 to receive information from the identification tag 200. In alternate embodiments, the transceiver 225 is constantly emitting the activation signal at discrete intervals, even when play object 10 is stationary.

The identification tag 200 is operable to receive the activation signal emitted by the transceiver 225. The activation signal energizes the identification tag 200 such that it generates and emits, in response to the activation signal, its own communication signal. More particularly, the identification tag 200 emits an identification signal in response to receiving the activation signal. The identification signal includes information related to the identity of the player using the play accessory 202. Some non-limiting examples of information included in the identification signal include the name of the player, the player's number, the player's team, the sex of the player, and the player's age. The information signal is received by the transceiver 225. The processor of the data-collecting unit 20 of each play object 10 is operable to wirelessly transmit the information signal away from the play object 10 for analysis and processing. In light of the preceding, it can be appreciated that the combination of the play object 10 and identification tag 200 allow for the automatic identification of the player performing the action on the play object 10.

This is more easily appreciated in relation to the embodiment depicted in FIG. 7. FIG. 7 shows three play objects 10*i*,10*ii*,10*iii*, three play accessories 202*i*,202*ii*,202*iii*, and three identification tags 200*i*,200*ii*,200*iii* each associated with one of the play accessories 202*i*,202*ii*,202*iii*. The identification tag 200*i*,200*ii*,200*iii* on each play accessory 202*i*,202*ii*,202*iii* provides identification information that is unique to that accessory 202*i*,202*ii*,202*iii*. For example, the identification tag 200*i* is associated with the play accessory 202*i*, and contains information on the player that uses the play accessory 202*i*. Therefore, the play accessory 202*i* is known as the hockey stick belonging to "Player A", in the depicted embodiment. When Player A uses the play accessory 202*i* to manipulate the play object 10*i*, the communication between the identification tag 200*i* on the play accessory 202*i* and the play object 10*i* informs the play object 10*i* that Player A is manipulating it. Similarly, when Player A uses the play accessory 202*i* to manipulate the different play object 10*ii*, the communication between the identification tag 200*i* and the play object 10*ii* informs the play object 10*ii* that Player A is manipulating it. The combination of the play object 10 and the identification tag 200 therefore allows the play object 10 to automatically and continuously output information on the identity of the player manipulating it. When the player starts manipulating a different play object 10, the identification tag 200 will communicate with the new play object 10 so that the identity of the user of the play accessory 202 is known. It is therefore possible, in the depicted embodiment, for the player to use her own hockey stick with many different pucks and still generate movement data indicative of player performance that is associated only with her.

This is in contrast with some conventional techniques for tracking player performance in a team setting, because players will use any play object that is lying around. In such a situation, it is difficult to associate data generated by the play object with a particular player. Other conventional techniques rely on associating player identification information with the play object itself. However, this is often costly, not feasible because the play object can be lost, or ineffective if another player uses the play object.

As previously mentioned, the mention of hockey pucks and sticks above does not limit the combination of the play object 10 and the identification tag 200 to being used only in the sport of hockey. The combination of the play object 10 and the identification tag 200 can be used in other sports and activities as well. For example, the play object 10 can be a baseball, and the identification tag 200 can be attached to a play accessory 202 that is a baseball glove. Similarly, the play object 10 can be a golf ball, and the identification tag 200 can be attached to a play accessory 202 that is a golf club. Similarly, the play object 10 can be a bowling ball, and the identification tag 200 can be attached to a play accessory 202 that is a bowling glove.

In the embodiment of FIG. 7, there is active/passive communication between the play object 10 and the identification tag 200. More particularly, the transceiver 225 is operable to actively emit the activation signal, and the identification tag 200 is operable to passively receive the activation signal. Stated differently, the passive component (i.e. the identification tag 200) does not actively search for the activation signal, and is instead energised by its receipt to emit the identification signal. The identification tag 200 therefore has no electrical power source. The active component (i.e. the transceiver 225) on the other hand receives electrical power to emit the activation signal, and possibly, to receive the identification signal. Examples of active/passive components that can be used as described above include a passive near field communication (NFC) tag used with the identification tag 200, and a RFID reader used with the transceiver 225. The NFC tag is relatively cheap and can be reprogrammed to add new identification information.

Referring to FIG. 2, there is also disclosed a method for collecting data about the play object 10. The method includes measuring the acceleration values about at least one translational degree of freedom at least during movement of the play object 10. The method also includes measuring the rotation values about at least one rotational degree of freedom. The method also includes wirelessly transmitting the acceleration and rotation values at discrete intervals from the play object 10. The acceleration and rotation values are indicative of performance of a player using the play object 10.

It can thus be appreciated that the play object 10, system 100, and method disclosed herein help to generate movement data at relatively high sampling frequencies. This improves the granularity of the movement data, which ultimately allows the player skills to be better assessed since any metric stemming from acceleration (e.g. velocity), for example, will be available at the highest possible resolution.

Producing such data indicative of player performance allows players from all levels to have feedback loops between training sessions and the skill being assessed. For example, the play object 10 may help determine whether doing forearm curls helps a player's slap shot. The play object 10 may therefore allow players to pinpoint a gym exercise that would directly correlate to an improvement in their performance. For example, any player will be able to measure the impact of improving their forearm curl weight on their shot velocity.

The play object 10, system 100, and method disclosed herein may also provide more objective assessments of player's skills, which may have a wide range of applications.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A play object in combination with an identification tag, the identification tag being attachable to a play accessory for engaging the play object, the play object and identification tag comprising:
   a body of the play object having an outer surface to be engaged by the play accessory upon a player using the play accessory, the body having an interior;
   a transceiver of the play object attached to the body and operable to emit an activation signal at least upon the body being engaged by the play accessory, and to receive signals from the identification tag;
   the identification tag on the play accessory being operable to receive the activation signal from the transceiver and to emit in response thereto an identification signal to the transceiver, the identification signal comprising information on the player using the play accessory; and
   a data-collecting unit of the play object disposed in the interior of the body and operable during at least movement of the play object, the data-collecting unit comprising:
      an accelerometer unit measuring acceleration values of the play object along at least one translational degree of freedom;
      a gyroscope unit measuring rotation values of the play object about at least one rotational degree of freedom;
      a processor in communication with the transceiver, the accelerometer unit, and the gyroscope unit, the processor obtaining the acceleration values from the accelerometer unit, the rotation values from the gyroscope unit, and the identification signal from the transceiver, the processor wirelessly transmitting the acceleration values, the rotation values, and the identification signal; and
      a power source supplying electrical power to the transceiver, the accelerometer unit, the gyroscope unit, and the processor.

2. The play object as defined in claim 1, wherein the transceiver is operable to emit the activation signal upon the accelerometer unit measuring an acceleration value exceeding a threshold value.

3. The play object as defined in claim 1, wherein the transceiver is operable to actively emit the activation signal, and the identification tag is operable to passively receive the activation signal.

4. The play object as defined in claim 3, wherein the identification tag is free of an electrical power source.

5. A plurality of play objects in combination with a plurality of identification tags as defined in claim 1, each identification tag being attachable to a single corresponding play accessory, the identification signal emitted by each identification tag comprising information on the identity of the player using said single play accessory.

6. The play object as defined in claim 1, wherein at least one of the accelerometer and gyroscope units is operable to measure the acceleration and rotation values at a sampling frequency, and wherein the processor is operable to wirelessly transmit the acceleration and rotation values at a transmission frequency, the sampling frequency being greater than the transmission frequency.

7. The play object as defined in claim 1, wherein the processor is operable to deactivate at least one of the accelerometer unit and the gyroscope unit to stop measurement of the acceleration or rotation values along at least one of the translational or rotational degrees of freedom.

\* \* \* \* \*